US008547569B2

(12) United States Patent
Maeda

(10) Patent No.: US 8,547,569 B2
(45) Date of Patent: Oct. 1, 2013

(54) INFORMATION PROCESSING SYSTEM AND INFORMATION PROCESSING DEVICE SUITABLE TO PERFORM PROCESS BY COMMUNICATING DATA AMONG PLURALITY OF INFORMATION PROCESSING DEVICES CONNECTED TO NETWORK, PROCESS CONDITION SETTING PROGRAM STORED ON A COMPUTER READABLE MEDIUM AND EXECUTED IN EACH OF PLURALITY OF INFORMATION PROCESSING DEVICES, AND PROCESS CONDITION SETTING METHOD

(75) Inventor: Toshihiro Maeda, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1539 days.

(21) Appl. No.: 11/600,877

(22) Filed: Nov. 17, 2006

(65) Prior Publication Data
US 2007/0177196 A1 Aug. 2, 2007

(30) Foreign Application Priority Data
Feb. 2, 2006 (JP) .................................. 2006-026058

(51) Int. Cl.
G06F 3/12 (2006.01)
(52) U.S. Cl.
USPC ........................................... 358/1.15; 710/15
(58) Field of Classification Search
USPC .......................................... 358/1.15; 710/15
See application file for complete search history.

(56) References Cited

U.S. PATENT DOCUMENTS 6,130,757 A * 10/2000 Yoshida et al. ............... 358/1.15
6,609,162 B1 * 8/2003 Shimizu et al. ................. 710/15

FOREIGN PATENT DOCUMENTS

| JP | 9-311838 | 12/1997 |
| JP | 2005-74881 A | 3/2005 |
| JP | 2005-148994 | 6/2005 |

OTHER PUBLICATIONS

Official Action issued by the Japanese Patent Office in corresponding JP Patent Application No. 2006-026058, Aug. 21, 2007; and corrected 1st page of English-translation thereof.
Official Action issued by the Japanese Patent Office in Corresponding JP Patent Application No. 2006-026058, Aug. 21, 2007; and English translation thereof.

* cited by examiner

Primary Examiner — King Poon
Assistant Examiner — Andrew H Lam
(74) Attorney, Agent, or Firm — Buchanan Ingersoll & Rooney PC

(57) ABSTRACT

In order to easily set a process condition with effective use of a function of each of a plurality of MFPs, an image processing system includes a plurality of MFPs connected to a network. Each of a plurality of MFPs includes a group function information storing unit to store, for each of a plurality of MFPs, function information which defines an individual process that does not allow processed data to be output to any MFP other than that MFP and a shared process that allows processed data to be output to any MFP other than that MFP, a setting screen display unit to read function information of all of a plurality of MFPs to display a setting screen that allows setting of a process condition for performing a process that can be performed in at least one of a plurality of MFPs, a process condition reception unit to receive the process condition, and an output unit to output the process condition to any one of a plurality of MFPs.

28 Claims, 7 Drawing Sheets

F I G. 5

| DEVICE IDENTIFYING INFORMATION | FUNCTION | FUNCTION PARAMETER | COMMAND | WHETHER SHARING IS ENABLED OR DISABLED | PROCESS SPEED |
|---|---|---|---|---|---|
| D1 | ... | | | | |
| D1 | Staple | | STAPLE | DISABLED | – |
| D1 | | Center 2Point | CENTER2PT | DISABLED | – |
| D1 | | Left 1Point | LEFT1PT | DISABLED | – |
| D1 | ROTATION | | ... | ENABLED | 500ms |
| D2 | Nup | | ... | ENABLED | 100ms |
| D2 | Punch | | ... | DISABLED | – |
| D3 | Water mark | | ... | ENABLED | 200ms |
| D3 | Punch | | ... | DISABLED | – |
| D3 | Nup | | ... | ENABLED | 1000ms |
| D3 | ... | | | | |

INFORMATION PROCESSING SYSTEM AND INFORMATION PROCESSING DEVICE SUITABLE TO PERFORM PROCESS BY COMMUNICATING DATA AMONG PLURALITY OF INFORMATION PROCESSING DEVICES CONNECTED TO NETWORK, PROCESS CONDITION SETTING PROGRAM STORED ON A COMPUTER READABLE MEDIUM AND EXECUTED IN EACH OF PLURALITY OF INFORMATION PROCESSING DEVICES, AND PROCESS CONDITION SETTING METHOD

This application is based on Japanese Patent Application No. 2006-026058 filed with Japan Patent Office on Feb. 2, 2006, the entire content of which is hereby incorporated by reference.

BACKGROUND OF THE INVENTION

1. Field of the Invention

The present invention relates to an information processing system, an information processing device, a process condition setting program stored on a computer readable medium, and a process condition setting method, and more particularly to an information processing system and an information processing device suitable to perform a process by communicating data among a plurality of information processing devices connected to a network, a process condition setting program stored on a computer readable medium and executed in each of a plurality of information processing devices, and a process condition setting method.

2. Description of the Related Art

Recently, an image processing device such as a scanner, printer or facsimile is generally connected to a network. In this manner, Japanese Laid-Open Patent Publication No. 9-311838 discloses a terminal device, in which what terminal device is connected to a network can easily be known. In this terminal device, a CPU for operation panel requests to disclose guidance information indicating the outline of each function provided by each of other terminals, receives the guidance information sent by each of other terminals, generates guidance display screen information based on the guidance information sent by each of other terminals, and displays the guidance display screen information on a liquid crystal touch panel.

However, according to the terminal device described in Japanese Laid-Open Patent Publication No. 9-311838, the outline of the function provided by each terminal is displayed for each terminal, so that the user can grasp the function provided by each terminal, but the user has to determine which terminal should perform which process. Especially when the number of terminals increases, it may be difficult to determine the terminal that performs a process. Therefore, unfortunately, it is difficult to define a process to be performed.

SUMMARY OF THE INVENTION

The present invention is made to solve the aforementioned problem. An object of the present invention is to provide an information processing system and an information processing device capable of easily setting a process condition with effective use of a function of each of a plurality of information processing devices.

Another object of the present invention is to provide a process condition setting program stored on a computer readable medium and a process condition setting method, in which a process condition can easily be set with effective use of a function of each of a plurality of information processing devices.

In order to achieve the aforementioned objects, in accordance with an aspect of the present invention, an information processing system includes a plurality of information processing devices connected to a network. Each of the plurality of information processing devices includes: a storage unit to store, for each of the plurality of information processing devices, function information which defines an individual process that does not allow processed data to be output to any information processing device other than the information processing device and a shared process that allows processed data to be output to any of all information processing devices other than the information processing device; a setting screen display unit to read the function information of all of the plurality of information processing devices stored in the storage unit and display a setting screen that allows setting of a process condition for performing a process that can be performed in at least one of the plurality of information processing devices; a process condition reception unit to receive the process condition; and an output unit to output the received process condition to any one of the plurality of information processing devices.

In accordance with another aspect of the present invention, a process condition setting program stored on a computer readable medium is executable in each of a plurality of information processing devices connected to a network. The process condition setting program includes the steps of: storing function information which defines, for each of the plurality of information processing devices, an individual process that does not allow processed data to be output to any information processing device other than the information processing device and a shared process that allows processed data to be output to any of all information processing devices other than the information processing device; reading the stored function information of all of the plurality of information processing devices to display a setting screen that allows setting of a process condition for performing a process that can be performed in at least one of the plurality of information processing devices; receiving the process condition; and outputting the received process condition to any one of the plurality of information processing devices.

In accordance with a further aspect of the present invention, a process condition setting method can be performed in each of a plurality of information processing devices connected to a network. The process condition setting method includes the steps of storing function information which defines, for each of the plurality of information processing devices, an individual process that does not allow processed data to be output to any information processing device other than the information processing device and a shared process that allows processed data to be output to any of all information processing devices other than the information processing device; reading the stored function information of all of the plurality of information processing devices to display a setting screen that allows setting of a process condition for performing a process that can be performed in at least one of the plurality of information processing devices; receiving the process condition; and outputting the received process condition to any one of the plurality of information processing devices.

In accordance with a further aspect of the present invention, an information processing device is used in an information processing system comprising a plurality of information processing devices connected to a network. The information processing device includes: a storage unit to store, for each of the plurality of information processing devices, function information which defines an individual process that does not allow processed data to be output to any information processing device other than the information processing device and a shared process that allows processed data to be output to any of all information processing devices other than the information processing device; a setting screen display unit to read the function information of all of the plurality of information processing devices stored in the storage unit and display a setting screen that allows setting of a process condition for performing a process that can be performed in at least one of the plurality of information processing devices; a process condition reception unit to receive said process condition; and an output unit to output the received process condition to any one of the plurality of information processing devices.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows exemplary group function information.

DESCRIPTION OF THE PREFERRED EMBODIMENTS

Figure 1:
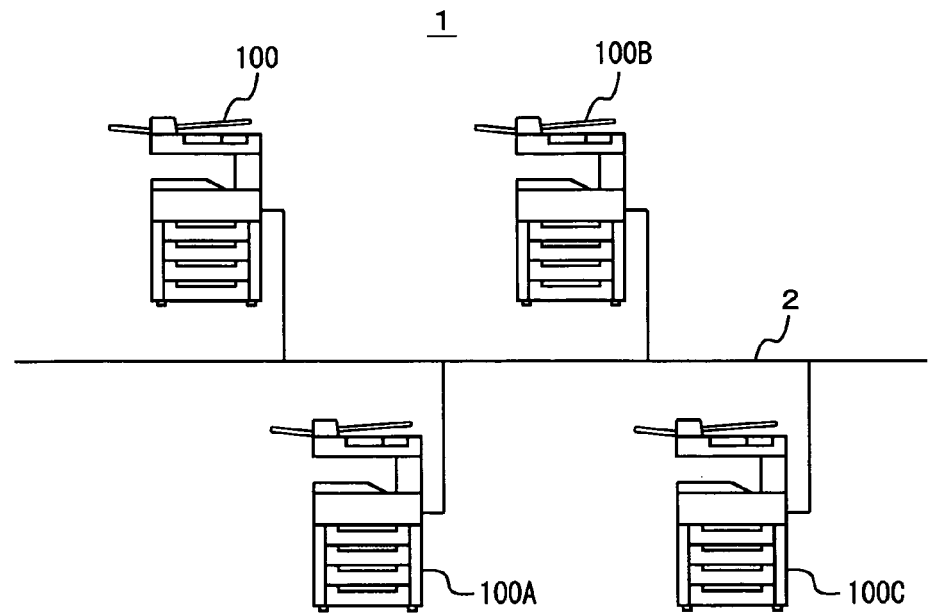
FIG. 1 shows an entire overview of an image processing system in an embodiment of the present invention.

In the following, an embodiment of the present invention will be described with reference to the figures. In the following description, the same parts will be denoted with the same reference characters. The designations and functions are also the same. Therefore, the detailed description thereof will not be repeated.

FIG. 1 shows an entire overview of an image processing system in an embodiment of the present invention. Referring to FIG. 1, an image processing system 1 includes Multi Function Peripherals (referred to as "MFP" hereinafter) 100, 100A, 100B, 100C each connected to a network 2. It is noted that in the present embodiment, MFPs 100, 100A, 100B, 100C will be described by way of example. However, in place of MFPs 100, 100A, 100B, 100C, for example, a scanner, image forming device, facsimile, personal computer that generates image data, and the like may be used, as long as they include a function of processing an image. Network 2 is a Local Area Network (LAN) and is connected whether wired or wireless. Furthermore, network 2 is not limited to LAN and may be a Wide Area Network (WAN), Public Switched Telephone Network (PSTN), the Internet, or the like.

Image processing system 1 in the present embodiment includes four MFPs 100, 100A, 100B, 100C, which constitute a group. It is noted that the number of MFPs that constitute a group is not limited to four, and any number more than one is applicable. MFPs 100, 100A, 100B, 100C may include the same or different functions and each basically includes at least any of an image reading function of reading a document to output image data, an image processing function of processing image data, an image formation function of forming an image on a recording sheet such as paper based on image data, a postprocessing function including a punching hole process, a sorting process, and the like on a recording sheet after image formation, and a facsimile reception/transmission function. In image processing system 1, the user enters a process condition and data in any of MFPs 100, 100A, 100B, 100C, so that that data is processed in image processing system 1 as a whole according to the process condition. For example, when a process condition and data are input to MFP 100, it is possible to input a process condition for processing data using even an function that is not included in MFP 100, if the function is included in any of other MFPs 100A, 100B, 100C. If the input process condition includes a process condition for performing a function that is not included in MFP 100, MFP 100 transmits the data and process condition to one of other MFPs 100A, 100B, 100C that includes the function, to request to perform a process.

On the other hand, each of MFPs 100, 100A, 100B, 100C includes an individual process that does not allow processed data to be output to any device other than itself, and a shared process that allows processed data to be output to any device other than itself. For example, MFP 100 includes a process that does not allow processed data to be output to any of MFPs 100A, 100B, 100C, and a process that allows processed data to be output to any of MFPs 100A, 100B, 100C. Processes on a recording sheet having an image formed thereon includes postprocessing such as a sorting process, a punching hole process, a stapling process, and the like. The postprocessing is an individual process. An enlargement process of enlarging an image and a reduction process of reducing an image, which are performed on image data, may be shared processes. However, whether a shared process or an individual process is defined by the setting of a device.

In image processing system 1, among four MFPs 100, 100A, 100B, 100C that constitute a group, MFP 100 in particular is called a master MFP 100. Master MFP 100 collects function information about a function included in each of MFPs 100, 100A, 100B, 100C included in the group to generate group function information and transmits the generated group function information to other MFPs 100A, 100B, 100C included in the group. Therefore, all the MFPs 100, 100A, 100B, 100C included in the group each can store the same group function information. It is noted that although master MFP 100 generates group function information here by way of illustration, each of MFPs 100, 100A, 100B, 100C included in the group may generate group function information without providing master MFP 100 for the group.

Each of MFPs 100, 100A, 100B, 100C has a different function. Here, assuming that MFP 100 has all the functions, the configuration of MFP 100 will be described.

Figure 2:
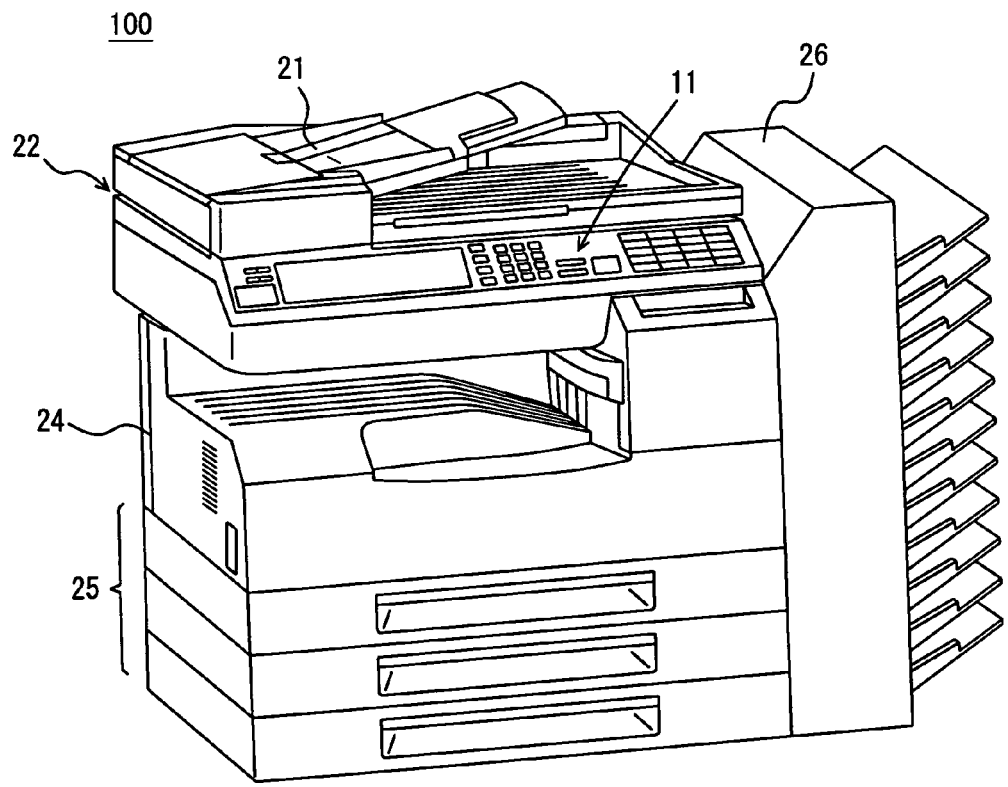
FIG. 2 is a perspective view of an overview of MFP.

FIG. 2 is a perspective view showing the overview of MFP. Referring to FIG. 2, MFP 100 includes an automatic document feeder (ADF) 21, an image reading unit 22, an image formation unit 24, a paper-feeding unit 25, and a postprocessing unit 26. ADF 21 carries multiple sheets of documents placed on a document plate separately one by one to image reading unit 22. Image reading unit 22 optically reads image information such as a photograph, character, and picture from the document to obtain image data. Upon reception of the image data, image formation unit 24 prints an image on a recording sheet such as paper based on the image data. Paper-feeding unit 25 has recording sheets stored therein and supplies the stored recording sheets to image formation unit 24 one by one. Postprocessing unit 26 ejects a recording sheet having an image formed thereon. Postprocessing unit 26 has a plurality of copy receiving trays and can sort the recording sheets for ejection. Furthermore, postprocessing unit 26 includes a punching hole process unit and a stapling process unit and can perform a punching hole process or a stapling process on the received recording sheet. In addition, MFP 100 includes an operation panel 11 on the upper surface thereof as a user interface with the user.

Figure 3:
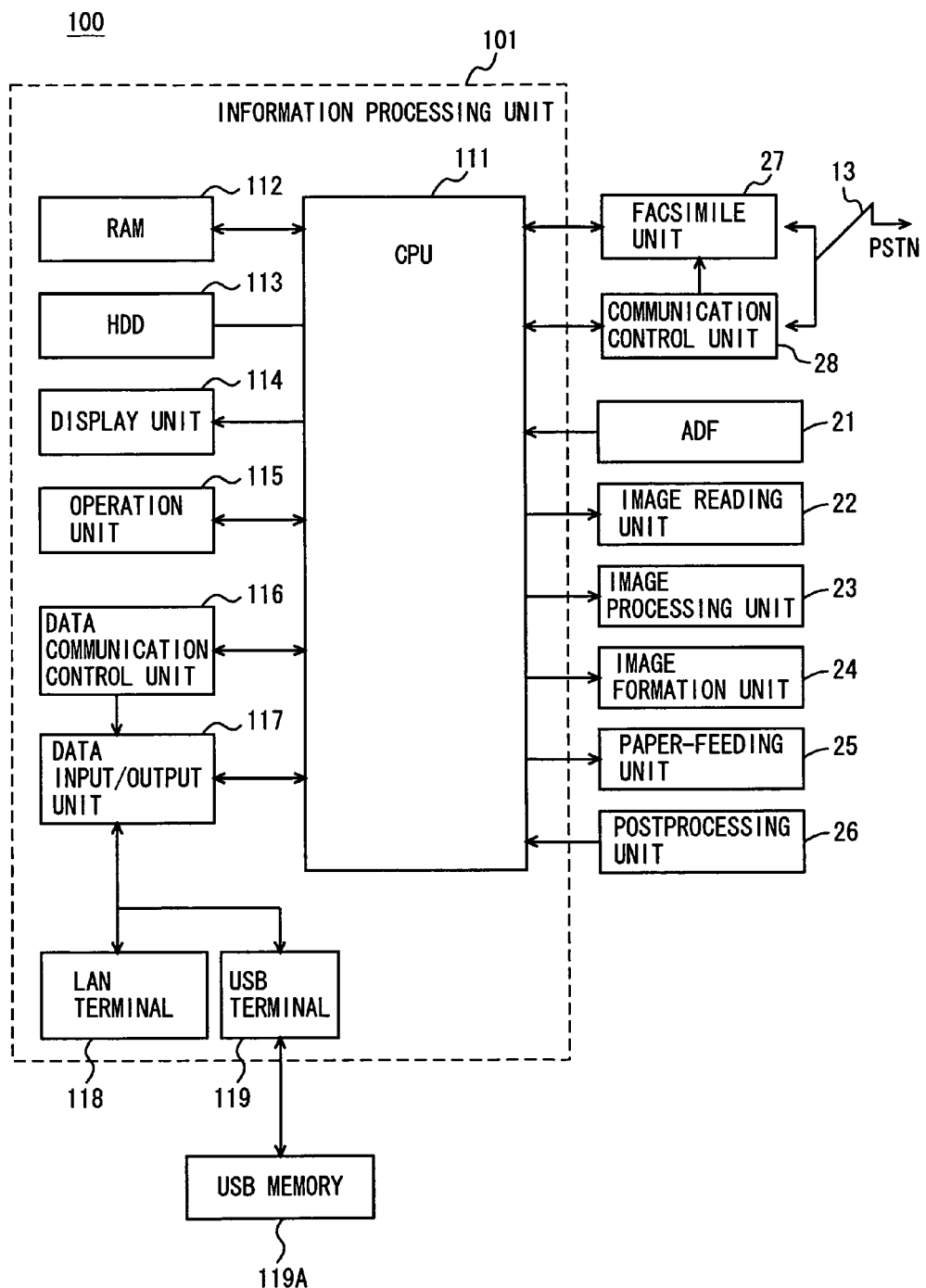
FIG. 3 is a block diagram showing an exemplary hardware configuration of MFP.

FIG. 3 is a block diagram showing an exemplary hardware configuration of MFP. Referring to FIG. 3, MFP 100 includes an information processing unit 101, a facsimile unit 27, a communication control unit 28, ADF 21, image reading unit 22, image processing unit 23, image formation unit 24, paper-feeding unit 25, and postprocessing unit 26. Information processing unit 101 includes a central processing unit (CPU) 111, an RAM (Random Access Memory) 112 for use as a work area for CPU 111, a hard disk drive (HDD) 113 to store data in a nonvolatile manner, a display unit 114, an operation unit 115, a data communication control unit 116, and a data input/output unit 117. CPU 11 is connected to each of data input/output unit 117, data communication control unit 116, operation unit 115, display unit 114, HDD 113, and RAM 112 to control the entire information processing unit 101. Furthermore, CPU 111 is also connected to facsimile unit 27, communication control unit 28, ADF 21, image reading unit 22, image processing unit 23, image formation unit 24, paper-feeding unit 25, and postprocessing unit 26 to control the entire MFP 100.

Image processing unit 23 is controlled by CPU 111 and performs image processing on image data based on an instruction from CPU 111. The image data includes image data output by image reading unit 22 reading a document, image data received through data input/output unit 117 from any other MFP 100A, 100B, 100C, and image data stored in HDD 113. The image processing includes, for example, an enlargement process of enlarging an image, a reduction process of reducing an image, a combination process of combining a plurality of images to generate one image, a rotation process of rotating an image to change the direction, and the like.

Display unit 114 is a display device such as a liquid crystal display (LCD) or Organic ELD (Electro Luminescence Display) to display instruction menus for the user, information on the acquired image data, and the like. Operation unit 115 includes a plurality of keys to receive inputs of data including a variety of instructions, characters, numerals through the user's operation corresponding to the keys. Operation unit 115 further includes a touch panel provided on display unit 114. Display unit 114 and operation unit 115 constitute an operation panel 11.

Data communication control unit 116 is connected to data input/output unit 117. Data communication control unit 116 controls data input/output unit 117 according to an instruction from CPU 111 to receive/transmit data from/to external equipment connected to data input/output unit 117. Data input/output unit 117 has an LAN terminal 118 serving as the interface for communications using a communication protocol such as TCP (Transmission Control Protocol) or FTP (File Transfer Protocol) and a USB (Universal Serial Bus) terminal 119.

When a LAN cable for connecting to network 2 is connected to LAN terminal 118, data communication control unit 116 controls data input/output unit 117 to communicate with MFPs 100A, 100B, 100C connected through LAN terminal 118.

When equipment is connected to USB terminal 119, data communication control unit 116 controls data input/output unit 117 to communicate with the connected equipment for data input/output. USB terminal 119 is connectable with a USB memory 119A containing a flash memory. USB memory 119A stores a process condition setting program described later, so that CPU 111 controls data communication control unit 116 to read the process condition setting program from USB memory 119A and store the read process condition setting program in RAM 112 for execution.

It is noted that the recording medium for storing the process condition setting program is not limited to USB memory 119A and may be a medium that fixedly carries a program such as a flexible disk, a cassette tape, an optical disk (CD-ROM (Compact Disc-Read Only Memory)/MO (Magnetic Optical Disc)/MD (Mini Disc)/DVD (Digital Versatile Disc)), an IC card (including a memory card), an optical card, or a semiconductor memory such as a mask ROM, EPROM (Erasable Programmable ROM), EEPROM (Electronically EPROM). Alternatively, CPU 111 may download the process condition setting program from a computer connected to network 2 for storage into HDD 113, or a computer may write the process condition setting program stored in HDD 113, so that the process condition setting program stored in HDD 113 is loaded into RAM 112 to be executed by CPU 111. The program referred to herein not only includes a program directly executable by CPU 111 but also includes a program in the form of a source program, a compressed program, an encrypted program, and the like.

Facsimile unit 27 is connected to PSTN 13 to transmit facsimile data to PSTN 13 or receive facsimile data from PSTN 13. Facsimile unit 27 stores the received facsimile data in HDD 113 and, in addition, converts the received facsimile data into print data that can be printed in image formation unit 24, to output the print data to image formation unit 24. Image formation unit 24 thereby prints the facsimile data received by facsimile unit 27 on a recording sheet. In addition, facsimile unit 27 converts the data stored in HDD 113 into facsimile data for transmission to FAX connected to PSTN 13.

Each of MFPs 100, 100A, 100B, 100C at least includes any of image reading unit 22, image processing unit 23, image formation unit 24, and facsimile unit 27. Therefore, some of MFPs 100, 100A, 100B, 100C may not include all of ADF 21, image reading unit 22, image processing unit 23, image formation unit 24, paper-feeding unit 25, postprocessing unit 26, and facsimile unit 27. Each of MFPs 100, 100A, 100B, 100C has different functions depending on which of ADF 21, image reading unit 22, image processing unit 23, image formation unit 24, paper-feeding unit 25, postprocessing unit 26, and facsimile unit 27 is included.

In the foregoing description, image processing unit 23 includes an enlargement process, a reduction process, a combination process, and a rotation process by way of example. However, image processing unit 23 may perform at least one of an enlargement process, a reduction process, a combination process, and a rotation process. Therefore, functions may vary among those of MFPs 100, 100A, 100B, 100C which include image processing unit 23, depending on which of an enlargement process, a reduction process, a combination process, and a rotation process can be performed.

In addition, in the foregoing description, postprocessing unit 26 includes a sorting function, a stapling function, and a punching function, by way of example. However, at least one of those functions may be included. Therefore, among those of MFPs 100, 100A, 100B, 100C which include postprocessing unit 26, some may not include all of a sorting function, a stapling function, and a punching function. Therefore, functions may vary among those of MFPs 100, 100A, 100B, 100C which include postprocessing unit 26, depending on which of a sorting function, a stapling function, and a punching function is included.

Figure 4:
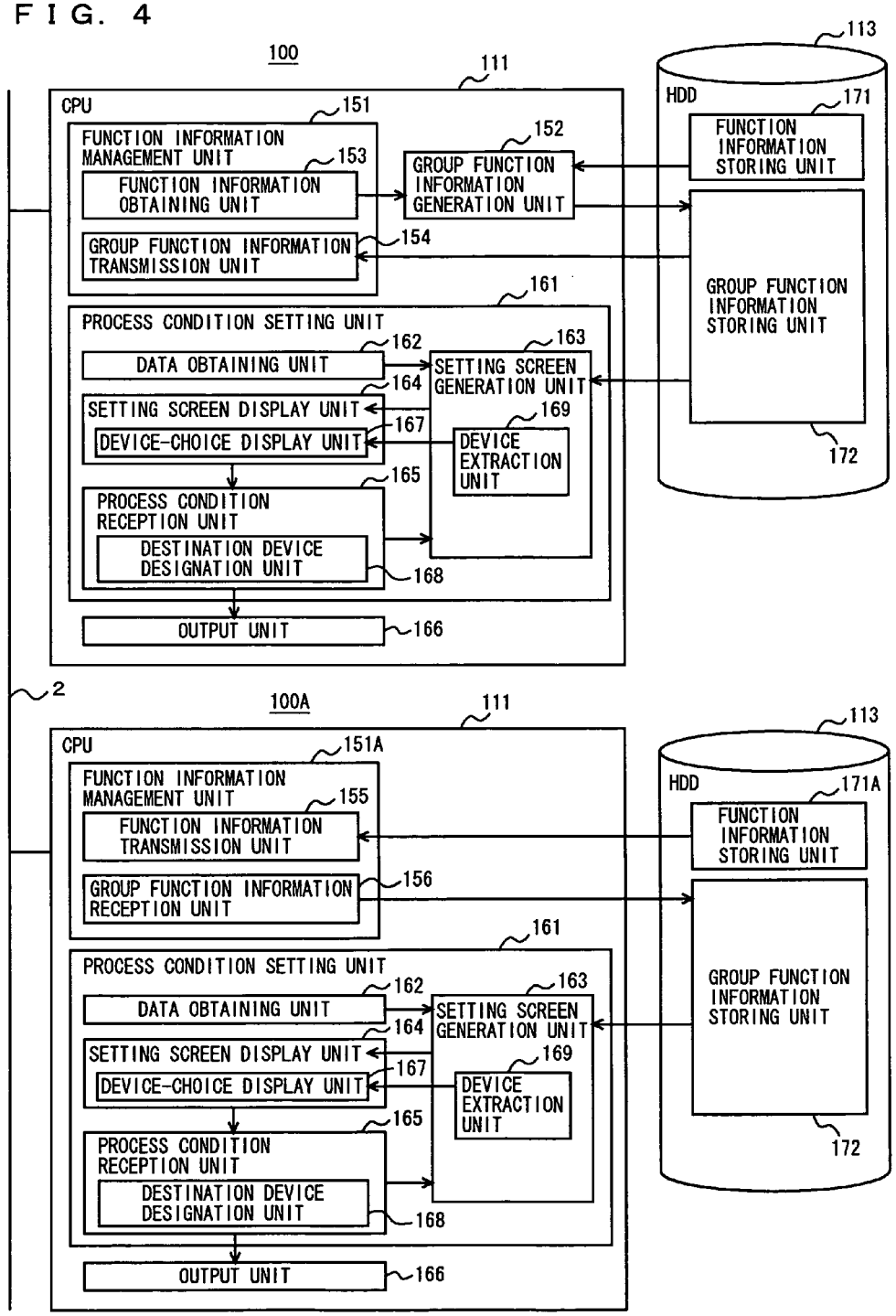
FIG. 4 is a functional block diagram showing an overview of a function of CPU of MFP with information stored in HDD.

The operations of MFPs 100A, 100B, 100C other than master MFP 100 are the same, and therefore the operations of MFP 100 and MFP 100A will be described here by way of example. FIG. 4 is a functional block diagram showing an overall function of CPU with information stored in HDD. In the figure, the same parts in MFP 100 and MFP 100A are denoted with the same numerals. Referring to FIG. 4, HDD 113 of master MFP 100 includes a function information storing unit 171, and HDD 113 of MFP 100A includes a function information storing unit 171A. Function information storing unit 171 of master MFP 100 stores function information, which defines an individual process that does not allow processed data to be output to MFPs 100A, 100B, 100C and a shared process that allows processed data to be output to any of MFPs 100A, 100B, 100C. Function information storing unit 171A of MFP 100A stores function information, which defines an individual process that does not allow processed data to be output to MFPs 100, 100B, 100C and a shared process that allows processed data to be output to any of MFP 100, 100B, 100C. HDD 113 of each of master MFP 100 and MFP 100A includes a group function information storing unit 172. Master MFP 100 and MFP 100A store the same group function information, which will be described later. MFPs 100, 100A, 100B, 100C forming the same group store the same group function information.

CPU 111 of master MFP 100 includes a function information management unit 151, a group function information generation unit 152, a process condition setting unit 161, and an output unit 166. Function information management unit 151 includes a function information obtaining unit 153 to obtain function information from other MFPs 100A, 100B, 100C, and a group function information transmission unit 154 to transmit group function information to other MFPs 100A, 100B, 100C. CPU 111 of MFP 100A includes a function information management unit 151A, a process condition setting unit 161, and an output unit 166. Function information management unit 151A includes a function information transmission unit 155 to transmit function information stored in function information storing unit 171A to master MFP 100 and a group function information reception unit 156 to receive group function information from master MFP 100.

Function information obtaining unit 153 of master MFP 100 sends a transmission request for function information to network 2 broadcast. Then, the transmission request is received by function information transmission unit 155 of MFP 100A. In response to receiving the transmission request, function information transmission unit 155 reads the function information stored in function information storing unit 171A and transmits the same to master MFP 100. Then, function information obtaining unit 153 of master MFP 100 receives function information from each of MFPs 100A, 100B, 100C. Function information obtaining unit 153 outputs function information from each of MFPs 100A, 100B, 100C to group function information generation unit 152.

Group function information generation unit 152 reads the function information of master MFP 100 from function information storing unit 171, and generates group function information including the function information of master MFP 100 and the function information of each of MFPs 100A, 100B, 100C for storage in group function information storing unit 172. Group function information transmission unit 154 transmits the group function information stored in group function information storing unit 172 to MFP 100A, 100B, 100C.

Accordingly, group function information reception unit 156 of MFP 100A receives the group function information and stores the received group function information in group function information storing unit 172 of MFP 100A. Therefore, the same group function information is stored in each of MFPs 100, 100A, 100B, 100C that constitute a group in image processing system 1.

FIG. 5 shows exemplary group function information. Referring to FIG. 5, the group function information is data in which device identifying information, functions, function parameters, commands, whether sharing is enabled or disabled, and process speeds are associated with one another. The device identifying information is information for identifying MFPs 100, 100A, 100B, 100C, and the group function information includes device identifying information of all of MFPs 100, 100A, 100B, 100C that constitute image processing system 1. Here, the device identifying information of MFP 100 is "D1", the device identifying information of MFP 100A is "D2", and the device identifying information of MFP 100B is "D3".

The function indicates a process. Specifically, the function "Staple" indicates a stapling process in postprocessing, the function "Rotation" indicates a rotation process in image processing, the function "Nup" indicates a combination process in image processing, the function "Watermark" indicates a process of embedding watermarking information in image processing, and the function "Punch" indicates a punching hole process in postprocessing.

The function parameter is a condition for performing a process. For example, in the punching hole process, parameter "Center2Point" indicates the condition that holes should be punched at two points at the center, and parameter "Left1Point" indicates the condition that a hole should be punched at one point at the left end.

Sharing is "disabled" if a corresponding function is an individual process that does not allow processed data to be output to another device, while sharing is "enabled" if a corresponding function is a shared process that allows processed data to be output to any other device. In other words, whether sharing is enabled or disabled defines whether a corresponding function is an individual process or a shared process.

Returning to FIG. 4, process condition setting unit 161 of master MFP 100 and process condition setting unit 161 of MFP 100A are the same, and therefore process condition setting unit 161 of master MFP 100 will be described. Process condition setting unit 161 includes a data obtaining unit 162 to obtain data to be processed, a setting screen generation unit 163 to generate a setting screen for setting up a process to be performed on data, a setting screen display unit 164 to display a setting screen, and a process condition reception unit 165 to receive an input of a process condition from the user.

Data obtaining unit 162 obtains image data output by image reading unit 22 reading a document. Furthermore, when the user operates operation unit 115 to designate data stored in HDD 113 with a file name or the like, data obtaining unit 162 reads the designated data from HDD 113. In addition, when the user operates operation unit 115 to designate data stored in another device, for example, HDD 113A of MFP 100A, MFP 100A is requested to transmit the designated data. MFP 100A having received the transmission request transmits the data, which is then received at data input/output unit 117. Data is thus obtained from data input/output unit 117.

Process condition reception unit 165 includes a destination device designation unit 168. When designation of a destination device is input to operation unit 115 by the user, destination device designation unit 168 outputs device identifying information for specifying the designated destination device to setting screen generation unit 163 and output unit 166. The device identifying information is assigned beforehand to each of MFPs 100, 100A, 100B, 100C. The device identifying information uses, for example, IP (Internet Protocol) address, MAC (Media Access Control) address, or the like.

Setting screen generation unit 163 generates a setting screen for setting a process condition. Setting screen generation unit 163 can generate two types of setting screens. The first type of setting screen provides display to allow setting of a process that can be performed in the group as a whole when device identifying information of a destination device is input from destination device designation unit 168. Here, MFP 100A is designated as a destination device, and device identifying information of MFP 100A is input, by way of example. Setting screen generation unit 163 reads group function information from group function information storing unit 172 to generate a setting screen that allows setting of a process condition for an individual process and a shared process of MFP 100A and a shared process of MFP 100, 100B, 100C, which is a process other than the individual process and the shared process of MFP 100A. As for a shared process that is common among two or more devices of MFPs 100, 100B, 100C, one region may suffice to set a process condition.

The second type of setting screen provides display to allow setting of a process that can be performed in the group as a whole when device identifying information of a destination device is not input from destination device designation unit 168. Setting screen generation unit 163 reads group function information from group function information storing unit 172 to generate a setting screen to allow setting of a process condition for performing a process that can be performed in at least one of MFPs 100, 100A, 100B, 100C. In other words, setting screen generation unit 163 generates a screen including a region in which a process condition for performing all the individual processes and the shared processes of each MFP 100, 100A, 100B, 100C can be set. As for a process that is common among two or more MFPs 100, 100A, 100B, 100C, one region may suffice to set a process condition.

Setting screen display unit 164 displays the first or second type of setting screen generated by setting screen generation unit 163 on display unit 114. Therefore, a setting screen for setting a process condition can be displayed as if image processing system 1 configured with MFPs 100, 100A, 100B, 100C was one device. For example, the user who operates MFP 100A to set a process condition can input a process condition without being aware of a process that can be performed by MFP 100A.

Setting screen generation unit 163 includes a device extraction unit 169. Device extraction unit 169 is activated when setting screen generation unit 163 generates the second type of setting screen. When the second type of setting screen is displayed by setting screen display unit 164, a process condition is input in process condition reception unit 165, and then the input process condition is output to setting screen generation unit 163. Upon reception of the process condition, device extraction unit 169 refers to group function information. If an individual process is included in the process condition, device extraction unit 169 extracts a device that can perform the individual process and outputs device identifying information of the extracted device to setting screen display unit 164. Whether or not an individual process is included in a process condition is determined, for at least one process included in the process condition, depending on whether or not there is any device having such a process set as a shared process, with reference to group function information. For at least one of the processes included in a process condition, if there is no device having such a process set as a shared process, it is determined that an individual process is included in the process condition. For all the processes included in the process condition, if there is any device having each process set as a shared process, it is determined that no individual process is included in the process condition. For example, if MFPs 100, 100A each have a combination process of combining a plurality of images as an individual process and MFPs 100B, 100C cannot perform a combination process, when a combination process is input as a process condition, it is determined that an individual process is included in the process condition since none of MFP 100, 100A, 100B, 100C sets a combination process as a shared process. Then, MFPs 100, 100A, which can perform a combination process as an individual process, are extracted, and their device identifying information is output to setting screen display unit 164. Furthermore, the image formation process and the postprocessing (collectively referred to as a "process subsequent to an image formation process") cannot be shared physically and thus are individual processes for all the devices. Accordingly, when a process subsequent to an image formation process for forming an image is input as a process condition, device extraction unit 169 refers to group function information to extract a device that can perform the process subsequent to an image formation process input as the process condition and then outputs the device identifying information of the extracted device to setting screen display unit 164. For example, if MFPs 100, 100A can perform a sorting process as postprocessing and MFPs 100B, 100C cannot perform a sorting process, when a process condition having a sorting process as postprocessing is input, MFPs 100, 100A are extracted, and their device identifying information is output to setting screen display unit 164.

Furthermore, when a plurality of individual processes are input as a process condition, device extraction unit 169 extracts a device that can perform all of the input plurality of individual processes and then outputs the device identifying information of the extracted device to setting screen display unit 164. If such a device does not exist, an error message is output to setting screen display unit 164 without extracting a device. This is because a plurality of individual processes input as a process condition can be performed by only one device.

Setting screen display unit 164 includes a device-choice display unit 167. Device-choice display unit 167 displays the device identifying information input from device extraction unit 169 as a device-choice on display unit 114. Thus, the device identifying information of a device that can perform an individual process is displayed according to the process condition input by the user, so that the user can easily decide on a destination device. When any of device identifying information displayed by device-choice display unit 167 is designated, device-choice display unit 167 outputs device identifying information of the designated device to output unit 166. Process condition reception unit 165 outputs the set process condition to output unit 166.

Output unit 166 receives device identifying information from destination device designation unit 168 or device-choice display unit 167, data from data obtaining unit 162, and a process condition from process condition reception unit 165. Output unit 166 decides on a device that performs each of a plurality of processes defined in a process condition based on group function information. Then, output unit 166 transmits the process condition, data, and device identifying information of the destination device to the decided device. If there are a plurality of devices that can perform a process defined in a process condition, a device having a higher processing ability is decided on. Alternatively, priorities may be assigned to devices beforehand, so that a device having a higher priority may be decided on. Alternatively, the load status of devices may be monitored, so that a device with a lower load may be decided on. Furthermore, in the case of processes that can be performed concurrently, two devices may be decided on. If MFP 100 is decided on as a device that performs a first process of a plurality of processes, MFP 100 processes data according to a process condition until a process decided to be performed by a device other than itself. At the time of a process to be performed by a device other than MFP 100, the unprocessed process condition, the processed data, and the device identifying information of the destination device are transmitted to the decided device. A process condition and data are transmitted together with device identifying information of a destination device, so that ultimately, the data and process condition are transmitted to the destination device, which in turn outputs data.

Figure 6:
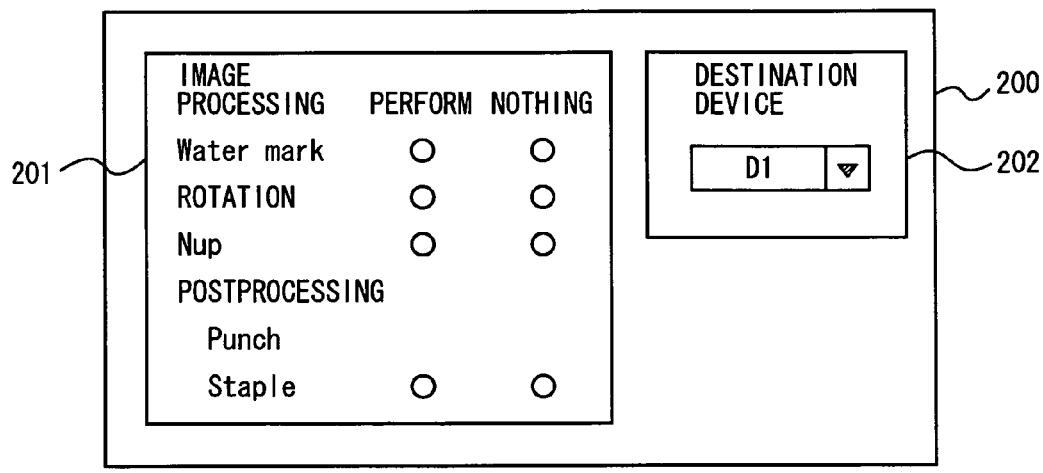
FIG. 6 shows a first type of setting screen by way of example.

FIG. 6 shows the first type of setting screen by way of example. Referring to FIG. 6, a first type of setting screen 200 includes a region 201 for inputting a process condition and a region 202 for specifying a destination device. At the stage of being initially displayed on display unit 114, first type of setting screen 200 only displays region 202 and nothing is displayed in region 201 for inputting a process condition. When any one of MFPs 100, 100A, 100B, 100C is designated as a destination device in region 202, a process condition that can be set to output a process at the destination device is displayed in region 201. The figure shows that MFP 100 with device identifying information "D1" is designated. As shown in FIG. 5, with device identifying information "D1", only the function "Staple" is set as an individual process and the function "Punch" is not set as an individual process. Therefore, region 201 is displayed such that the function "Punch" cannot be set as a process condition. Furthermore, device identifying information "D1" includes the function "Rotation" only as a shared process while device identifying information "D2" includes the function "Nup" as a shared process, and device identifying information "D3" includes the function "Watermark" and the function "Nup" as shared processes. Therefore, region 201 is displayed such that the function "Rotation" as well as the function "Watermark" and the function "Nup" can be set as a process condition.

Figure 7:
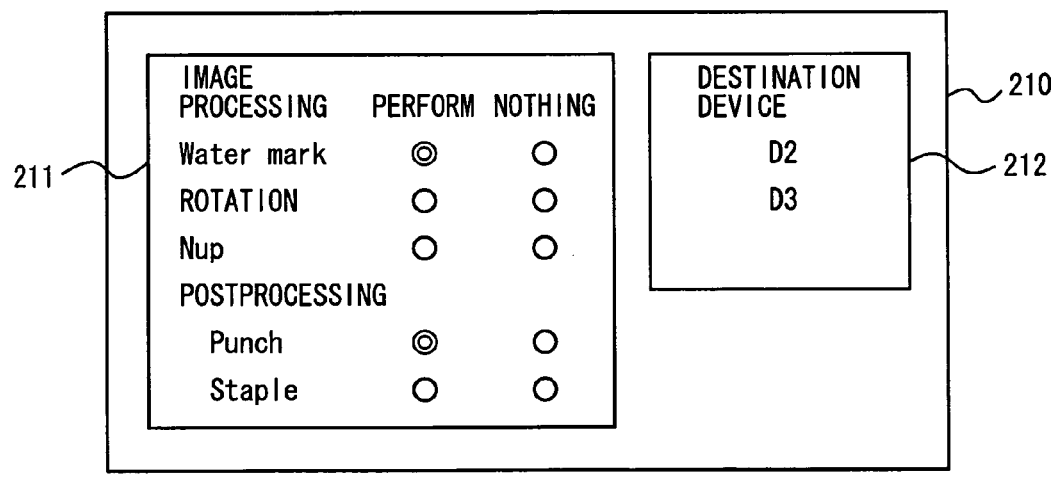
FIG. 7 shows a second type of setting screen by way of example.

FIG. 7 shows the second type of setting screen by way of example. Referring to FIG. 7, a second type of setting screen 210 includes a region 211 for inputting a process condition and a region 212 for designating a destination device. In second type of setting screen 210, at the stage of being initially displayed on display unit 114, region 211 provides display that allows setting of a process condition for a process that can be performed in image processing system 1 as a whole. Device identifying information for all the devices included in image processing system 1, that is, here, MFPs 100, 100A, 100B, 100C, is displayed in region 212. The user inputs a process condition in region 211, and when a process condition for postprocessing following an image formation process of forming an image is input, the device identifying information of devices that include postprocessing defined by the process condition as an individual process is selectably displayed. For example, at the stage in which second type of setting screen 210 is initially displayed on display unit 114, device identifying information "D1", "D2", "D3", "D4" for MFPs 100, 100A, 100B, 100C is displayed in region 212. Then, when the function "Punch" in postprocessing is set, only the device identifying information "D2", "D3" for MFPs 100A, 100B having the function "Punch" set as an individual process is displayed.

Figure 8A:
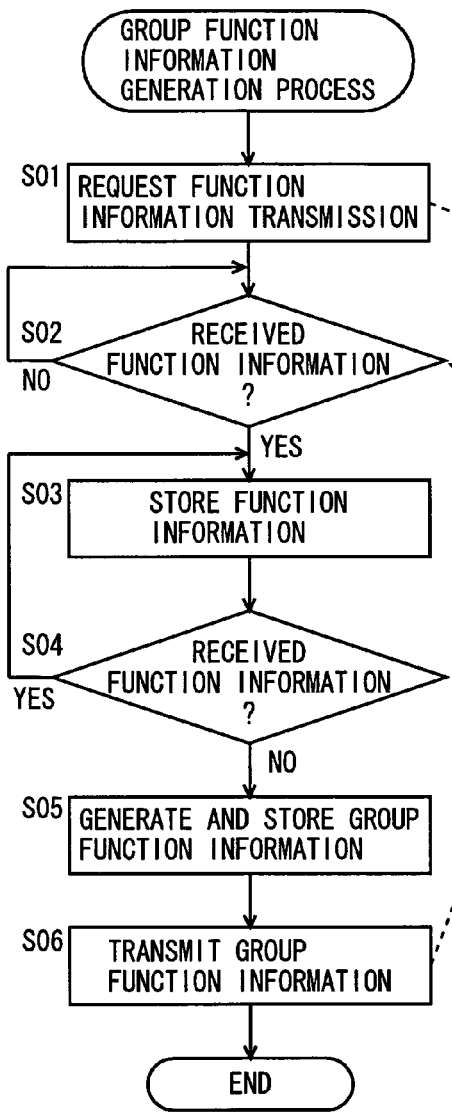
FIG. 8A illustrates a flow of a group function information generation process by way of example.
Figure 8B:
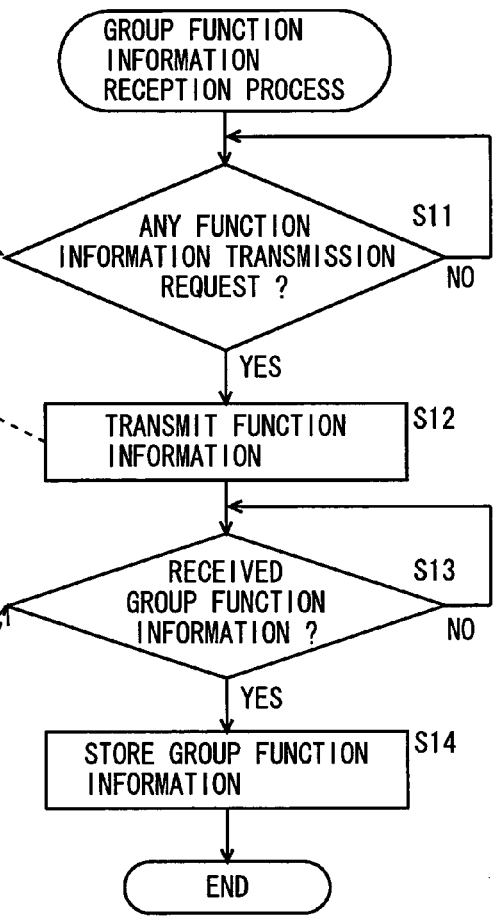
FIG. 8B illustrates a flow of a group function information reception process by way of example.

FIG. 8A illustrates a flow of a group function information generation process by way of example. The group function information generation process is a process performed by CPU 111 of master MFP 100 when CPU 111 of master MFP 100 executes a process condition setting program. FIG. 8B illustrates a group function information reception process by way of example. The group function information reception information is a process performed by CPU of each of MFPs 100A, 100B, 100C when CPU of each of MFPs 100A, 100B, 100C executes a process condition setting program. Here, the group function information reception process is performed by CPU 111 of MFP 100A by way of illustration.

CPU 111 of master MFP 100 transmits a transmission request for function information to network 2 broadcast (step S01). Then, the transmission request is received at MFP 100A (step S11). CPU 111 of MFP 100A is on standby until the transmission request is received (NO at step S11). Upon reception of the transmission request, CPU 111 of MFP 100A reads function information from function information storing unit 171A for transmission to master MFP 100 (step S12). Thus, the function information of MFP 100A is received at master MFP 100 (step S02).

After transmitting the transmission request, CPU 111 of master MFP 100 is on standby until receiving the function information (NO at step S02), and upon reception of the function information, it temporarily stores the received function information in RAM 112 (step S03). Then, it is determined whether or not function information is received from another device (step S04), and if received, the process returns to step S03. If not received after a prescribed period of time has passed, the process proceeds to step S05.

CPU 111 of master MFP 100 reads function information from function information storing unit 171 and generates group function information including the function information of master MFP 100 and the temporarily stored function information of each of MFPs 100A, 100B, 100C for storage in group function information storing unit 172 (step S05). Then, the group function information stored in group function information storing unit 172 is transmitted to MFPs 100A, 100B, 100C (step S06). Thus, the group function information is received at MFPs 100A, 100B, 100C.

After transmitting the function information at step S12, CPU 111 of MFP 100A is on standby until receiving the group function information (NO at step S13). Upon reception of the group function information, CPU 111 of MFP 100A stores the received group function information in group function information storing unit 172 of MFP 100A (step S14). Therefore, each of MFPs 100, 100A, 100B, 100C constituting a group in image processing system 1 stores the same group function information.

Figure 9:
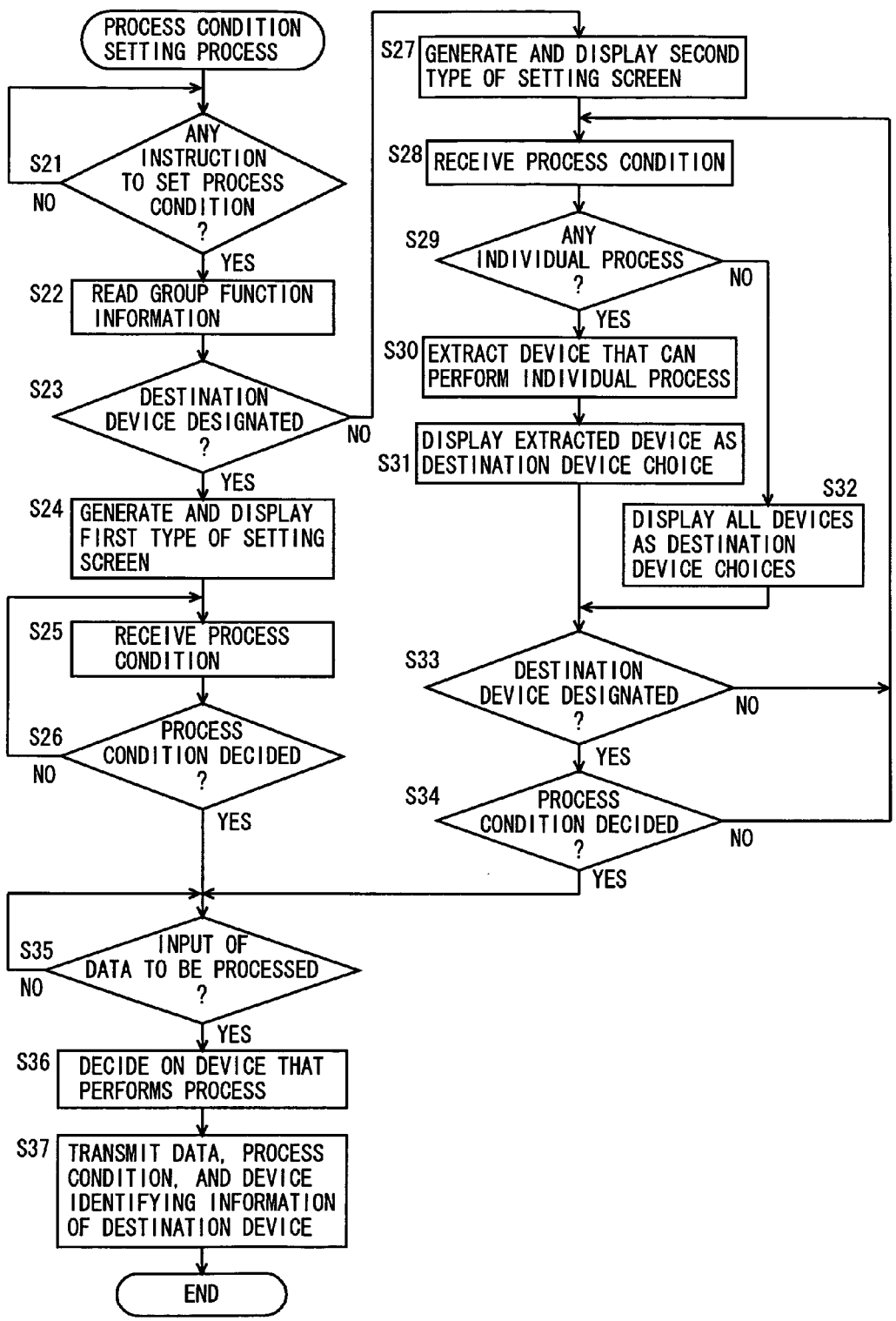
FIG. 9 is a flowchart illustrating a flow of a process condition setting process by way of example.

FIG. 9 is a flowchart illustrating a flow of a process condition setting process by way of example. The process condition setting process is a process performed by CPU of each of MFPs 100, 100A, 100B, 100C when CPU of each of MFPs 100, 100A, 100B, 100C executes a process condition setting program. Here, the process condition setting process is performed by CPU 111 of MFP 100 by way of illustration.

CPU 111 determines whether or not an instruction to set a process condition is provided (step S21). If an instruction to set a process condition is provided, the process proceeds to step S22, and if not, CPU 111 is on standby. CPU 111 detects that an instruction to set a process condition is input to operation unit 115 by the user. At step S22, group function information is read from group function information storing unit 172. Then, it is determined whether or not a destination device is designated (step S23). If the user operates operation unit 115 to designate a destination device, CPU 111 receives the device identifying information of the designated destination device from operation unit 115, and the process proceeds to step S24. On the other hand, if the user does not operate operation unit 115 to set a destination device in region 202, CPU 111 receives a signal indicating that no destination device is set from operation unit 115, and the process proceeds to step S27.

At step S24, first type of setting screen 200 (see FIG. 6) is generated and then displayed. CPU 111 generates and displays the first type of setting screen that allows setting of a process condition for an individual process and a shared process of a destination device as well as a shared process of any other device, other than the individual process and the shared process of the destination device. For example, when MFP 100A is designated as a destination device, CPU 111 reads group function information from group function information storing unit 172 to generate a screen that allows setting of a process condition for an individual process and a shared process of MFP 100A as well as a shared process of MFPs 100, 100B, 100C, other than the individual process and the shared process of MFP 100A, and display the generated screen in region 201 of first type of setting screen 200 appearing on display unit 114. Then, a process condition is received (step S25), and it is determined whether or not a process condition is decided by the user (step S26). If a process condition is decided, the process proceeds to step S35, and if not, the process returns to step S25.

On the other hand, at step S27, second type of setting screen 210 (see FIG. 7) is generated and then displayed. CPU 111 reads group function information from group function information storing unit 172 to generate and display the second type of setting screen that allows setting of a process condition for performing a process that can be performed in at least one of MFPs 100, 100A, 100B, 100C. Second type of setting screen 210 includes region 211 that allows setting of a process condition for performing all the individual processes and the shared processes of each of MFPs 100, 100A, 100B, 100C. Region 212 of second type of setting screen 210 displayed at step S27 shows the device identifying information of MFPs 100, 100A, 100B, 100C.

Then, a process condition is received (step S28), and it is determined whether or not an individual process is included in the received process condition with reference to group function information (step S29). If an individual process is included in the process condition, the process proceeds to step S30, and if not, the process proceeds to step S32. At step S30, a device that can perform the individual process included in the process condition is extracted. Then, the device identifying information of the extracted devices is selectably displayed as destination device choices in region 212 (step S31). On the other hand, at step S32, the device identifying information of all the devices is selectably displayed as destination device choices in region 212. At step S33, it is determined whether or not any one of the destination device choices displayed in region 212 is designated as a destination device by the user. If any destination device is designated, the process proceeds to step S34, and if not, the process returns to step S28. At step S34, it is determined whether or not a process condition is decided by the user. If a process condition is decided, the process proceeds to step S35, and if not, the process returns to step S28.

At step S35, it is determined whether or not data to be processed is input. Data to be processed is data that is processed according to the decided process condition at step S26 or step S34. Data to be processed is designated by the user and includes image data output by image reading unit 22 reading a document, data stored in HDD 113, and data stored in another device, for example, HDD 113 of MFP 100A. The standby state continues until data to be processed is input by the user's operation. Upon input of data, the process proceeds to step S36. At step S36, CPU 111 decides on a device that performs a process defined by the process condition decided at step S26 or step S34. Then, the device identifying information of the destination device designated at step S23 or the device identifying information of the destination device designated at step S33, data input at step S35, and the process condition decided at step S26 or step S34 are transmitted to the decided device (step S37). If a plurality of processes are defined in a process condition and MFP 100 is decided on as a device that performs a first process, MFP 100 processes data according to the process condition until the process decided to be performed by a device other than itself, and MFP 100 transmits the unprocessed process condition, the processed data, and the device identifying information of the destination device to the device decided to perform the subsequent process. The process condition and data are transmitted together with the device identifying information of the destination device, so that ultimately, the data and process condition are transmitted to the destination device. Then, the data is output from the destination device.

As described above, the image processing system in the present embodiment is formed of MFPs 100, 100A, 100B, 100C connected to network 2. Each of MFPs 100, 100A, 100B, 100C displays the first or second type of setting screen that allows setting of a process condition for performing a process that can be performed in MFPs 100, 100A, 100B, 100C as a whole, so that the user can set a process condition without being aware of a device for performing a process.

In addition, each of MFPs 100, 100A, 100B, 100C displays first type of setting screen 200 on display unit 114, and upon receiving designation of any of MFPs 100, 100A, 100B, 100C as a destination device, each of MFPs 100, 100A, 100B, 100C provides display that allows setting of a process condition for performing, on the designated data, an individual process and a shared process of the designated destination device as well as a shared process of all the devices other than the destination device that cannot be performed by the destination device. Therefore, the user can designate a destination device that outputs data and then inputs a process condition that allows processed data to be output at the destination device.

Furthermore, each of MFPs 100, 100A, 100B, 100C displays second type of setting screen 210 on display unit 114, and if a process defined by the received process condition includes an individual process, each of MFPs 100, 100A, 100B, 100C extracts and selectably displays the devices that can perform the individual process from MFPs 100, 100A, 100B, 100C. Thus, by designating the process condition, the user can select a device that can output the data processed according to the process condition.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing system comprising a plurality of information processing devices connected to a network, each of said plurality of information processing devices including:
    a storage unit to store, for each of said plurality of information processing devices, function information which defines an individual process that is performed by the information processing device itself and does not allow processed data to be output to any information processing device other than the information processing device, and function information that defines a shared process that can be performed by another of the information processing devices and allows processed data to be output to any of all information processing devices other than the information processing device, wherein the individual process function information is stored with a state identification that distinguishes it from shared process function information;
    a setting screen display unit to read the function information of all of said plurality of information processing devices stored in said storage unit and display a setting screen that allows setting of a process condition for performing a process that can be performed in at least one of said plurality of information processing devices;
    a process condition reception unit to receive said process condition; and
    an output unit to output said received process condition to any one of said plurality of information processing devices,
    each of said plurality of information processing devices further including:
    a data designation unit to receive designation of data to be processed; and
    a destination designation unit to receive designation of a destination device that outputs said designated data among said plurality of information processing devices, wherein
    said setting screen display unit provides display that allows setting of said process condition for performing said individual process and said shared process of said designated destination device and said shared process of all information processing devices other than said destination device that cannot be performed by said destination device.

2. The information processing system according to claim 1, wherein said output unit includes:
    a process performing device decision unit to decide on a device that performs a process defined by said process condition among said plurality of information processing devices, and
    a transmission unit to transmit said designated data, said process condition, and device identifying information for identifying said destination device to said decided device.

3. The information processing system according to claim 1, wherein at least one information processing device of said plurality of information processing devices further includes a function information obtaining unit to receive said function information from each of all information processing devices other than the information processing device.

4. The information processing system according to claim 3, wherein said at least one information processing device further includes a function information transmission unit to transmit function information of all of said plurality of information processing devices to all information processing devices other than the information processing device.

5. An information processing system comprising a plurality of information processing devices connected to a network, each of said plurality of information processing devices including:
    a storage unit to store, for each of said plurality of information processing devices, function information which defines an individual process that is performed by the information processing device itself and does not allow processed data to be output to any information processing device other than the information processing device, and function information that defines a shared process that can be performed by another of the information processing devices and allows processed data to be output to any of all information processing devices other than the information processing device, wherein the individual process function information is stored with a state identification that distinguishes it from shared process function information;
    a setting screen display unit to read the function information of all of said plurality of information processing devices stored in said storage unit and display a setting screen that allows setting of a process condition for performing a process that can be performed in at least one of said plurality of information processing devices;
    a process condition reception unit to receive said process condition; and
    an output unit to output said received process condition to any one of said plurality of information processing devices,
    each of said plurality of information processing devices further including:
    a data designation unit to receive designation of data to be processed;
    a performable device display unit to extract and display, if said individual process is included in said received process condition, an information processing device that can perform the individual process from said plurality of information processing devices; and
    a destination device designation unit to receive designation of a destination device that outputs said designated data from said displayed information processing device.

6. The information processing system according to claim 5, wherein said performable device display unit extracts and displays an information processing device that can perform a process subsequent to an image formation process included in said received process condition from said plurality of information processing devices.

7. The information processing system according to claim 5, wherein said output unit includes:
    a process performing device decision unit to decide on a device that performs a process defined by said process condition among said plurality of information processing devices, and
    a transmission unit to transmit said designated data, said process condition, and device identifying information for identifying said destination device to said decided device.

8. A nontransitory computer readable medium on which is encoded a process condition setting program and executable in one of a plurality of information processing devices connected to a network, said process condition setting program causing said information processing device to execute processing comprising the steps of:

storing function information which defines, for each of said plurality of information processing devices, an individual process that is performed by the information processing device itself and does not allow processed data to be output to any information processing device other than the information processing device, and function information that defines a shared process that can be performed by another of the information processing devices and allows processed data to be output to any of all information processing devices other than the information processing device, wherein the individual process function information is stored with a state identification that distinguishes it from shared process function information;

reading said stored function information of all of said plurality of information processing devices to display a setting screen that allows setting of a process condition for performing a process that can be performed in at least one of said plurality of information processing devices;

receiving said process condition; and outputting said received process condition to any one of said plurality of information processing devices, said processing further comprising the steps of:

receiving designation of data to be processed; and receiving designation of a destination device that outputs said designated data among said plurality of information processing devices, wherein said step of displaying a setting screen includes the step of providing display that allows setting of said process condition for performing said individual process and said shared process of said designated destination device and said shared process of all information processing devices other than said destination device that cannot be performed by said destination device.

9. The nontransitory computer readable medium according to claim 8, wherein said outputting step includes the steps of:

deciding on a device that performs a process defined by said process condition among said plurality of information processing devices, and transmitting said designated data, said process condition, and device identifying information for identifying said destination device to said decided device.

10. The nontransitory computer readable medium according to claim 8, wherein said processing further comprising the step of receiving said function information of all the other information processing devices of said plurality of information processing devices.

11. The nontransitory computer readable medium according to claim 10, wherein said processing further comprising the step of transmitting said function information of all of said plurality of information processing devices to all the other information processing devices of said plurality of information processing devices.

12. A nontransitory computer readable medium on which is encoded a process condition setting program and executable in one of a plurality of information processing devices connected to a network, said process condition setting program causing said information processing device to execute processing comprising the steps of:

storing function information which defines, for each of said plurality of information processing devices, an individual process that is performed by the information processing device itself and does not allow processed data to be output to any information processing device other than the information processing device, and function information that defines a shared process that can be performed by another of the information processing devices and allows processed data to be output to any of all information processing devices other than the information processing device, wherein the individual process function information is stored with a state identification that distinguishes it from shared process function information;

reading said stored function information of all of said plurality of information processing devices to display a setting screen that allows setting of a process condition for performing a process that can be performed in at least one of said plurality of information processing devices;

receiving said process condition; and outputting said received process condition to any one of said plurality of information processing devices, said processing further comprising the steps of:

receiving designation of data to be processed;

if said individual process is included in said received process condition, extracting and displaying an information processing device that can perform the individual process from said plurality of information processing devices; and receiving designation of a destination device that outputs said designated data from said displayed information processing device.

13. The nontransitory computer readable medium according to claim 12, wherein said outputting step includes the steps of:

deciding on a device that performs a process defined by said process condition among said plurality of information processing devices, and transmitting said designated data, said process condition, and device identifying information for identifying said destination device to said decided device.

14. The nontransitory computer readable medium according to claim 12, further comprising said performable device display unit extracting and displaying an information processing device that can perform a process subsequent to an image formation process included in said received process condition from said plurality of information processing devices.

15. A process condition setting method that can be performed in one of a plurality of information processing devices connected to a network, said process condition setting method comprising the steps of:

storing function information which defines, for each of said plurality of information processing devices, an individual process that is performed by the information processing device itself and does not allow processed data to be output to any information processing device other than the information processing device, and function information that defines a shared process that can be performed by another of the information processing devices and allows processed data to be output to any of all information processing devices other than the information processing device, wherein the individual process function information is stored with a state identification that distinguishes it from shared process function information;

reading said stored function information of all of said plurality of information processing devices to display a setting screen that allows setting of a process condition for performing a process that can be performed in at least one of said plurality of information processing devices;

receiving said process condition; and outputting said received process condition to any one of said plurality of information processing devices, said method further comprising the steps of:

receiving designation of data to be processed; and receiving designation of a destination device that outputs said designated data among said plurality of information processing devices, wherein said step of displaying a setting screen includes the step of providing display that allows setting of said process condition for performing said individual process and said shared process of said designated destination device and said shared process of all information processing devices other than said destination device that cannot be performed by said destination device.

16. The process condition setting method according to claim 15, wherein said outputting step includes the steps of:

deciding on a device that performs a process defined by said process condition among said plurality of information processing devices, and transmitting said designated data, said process condition, and device identifying information for identifying said destination device to said decided device.

17. The process condition setting method according to claim 15, further comprising the step of receiving said function information of all the other information processing devices of said plurality of information processing devices.

18. The process condition setting method according to claim 17, further comprising the step of transmitting said function information of all of said plurality of information processing devices to all the other information processing devices of said plurality of information processing devices.

19. A process condition setting method that can be performed in one of a plurality of information processing devices connected to a network, said process condition setting method comprising the steps of:

storing function information which defines, for each of said plurality of information processing devices, an individual process that is performed by the information processing device itself and does not allow processed data to be output to any information processing device other than the information processing device, and function information that defines a shared process that can be performed by another of the information processing devices and allows processed data to be output to any of all information processing devices other than the information processing device, wherein the individual process function information is stored with a state identification that distinguishes it from shared process function information;

reading said stored function information of all of said plurality of information processing devices to display a setting screen that allows setting of a process condition for performing a process that can be performed in at least one of said plurality of information processing devices;

receiving said process condition; and outputting said received process condition to any one of said plurality of information processing devices, said method further comprising the steps of:

receiving designation of data to be processed;

if said individual process is included in said received process condition, extracting and displaying an information processing device that can perform the individual process from said plurality of information processing devices; and receiving designation of a destination device that outputs said designated data from said displayed information processing device.

20. The process condition setting method according to claim 19, wherein said outputting step includes the steps of:

deciding on a device that performs a process defined by said process condition among said plurality of information processing devices, and transmitting said designated data, said process condition, and device identifying information for identifying said destination device to said decided device.

21. The process condition setting method according to claim 19, further comprising said performable device display unit extracting and displaying an information processing device that can perform a process subsequent to an image formation process included in said received process condition from said plurality of information processing devices.

22. An information processing device for use in an information processing system comprising a plurality of information processing devices connected to a network, said information processing device comprising:

a storage unit to store, for each of said plurality of information processing devices, function information which defines an individual process that is performed by the information processing device itself and does not allow processed data to be output to any information processing device other than the information processing device, and function information that defines a shared process that can be performed by another of the information processing devices and allows processed data to be output to any of all information processing devices other than the information processing device, wherein the individual process function information is stored with a state identification that distinguishes it from shared process function information;

a setting screen display unit to read the function information of all of said plurality of information processing devices stored in said storage unit and to display a setting screen that allows setting of a process condition for performing a process that can be performed in at least one of said plurality of information processing devices;

a process condition reception unit to receive said process condition; and an output unit to output said received process condition to any one of said plurality of information processing devices;

a data designation unit to receive designation of data to be processed; and a destination designation unit to receive designation of a destination device that outputs said designated data among said plurality of information processing devices, wherein said setting screen display unit provides display that allows setting of said process condition for performing said individual process and said shared process of said designated destination device and said shared process of all information processing devices other than said destination device that cannot be performed by said destination device.

23. The information processing device according to claim 22, wherein said output unit includes:

a process performing device decision unit to decide on a device that performs a process defined by said process condition among said plurality of information processing devices, and a transmission unit to transmit said designated data, said process condition, and device identifying information for identifying said destination device to said decided device.

24. The information processing device according to claim 22, further comprising a function information obtaining unit to receive said function information from each of all information processing devices other than the information processing device.

25. The information processing device according to claim 24, further comprising a function information transmission unit to transmit function information of all of said plurality of information processing devices to all information processing devices other than the information processing device.

26. An information processing device for use in an information processing system comprising a plurality of information processing devices connected to a network, said information processing device comprising:
- a storage unit to store, for each of said plurality of information processing devices, function information which defines an individual process that is performed by the information processing device itself and does not allow processed data to be output to any information processing device other than the information processing device, and function information that defines a shared process that can be performed by another of the information processing devices and allows processed data to be output to any of all information processing devices other than the information processing device, wherein the individual process function information is stored with a state identification that distinguishes it from shared process function information;
- a setting screen display unit to read the function information of all of said plurality of information processing devices stored in said storage unit and to display a setting screen that allows setting of a process condition for performing a process that can be performed in at least one of said plurality of information processing devices;
- a process condition reception unit to receive said process condition; and
- an output unit to output said received process condition to any one of said plurality of information processing devices;
- a data designation unit to receive designation of data to be processed;
- a performable device display unit to extract and display, if said individual process is included in said received process condition, an information processing device that can perform the individual process from said plurality of information processing devices; and
- destination device designation unit to receive designation of a destination device that outputs said designated data from said displayed information processing device.

27. The information processing device according to claim 26, wherein said performable device display unit extracts and displays an information processing device that can perform a process subsequent to an image formation process included in said received process condition from said plurality of information processing devices.

28. The information processing device according to claim 26, wherein said output unit includes:
- a process performing device decision unit to decide on a device that performs a process defined by said process condition among said plurality of information processing devices, and
- a transmission unit to transmit said designated data, said process condition, and device identifying information for identifying said destination device to said decided device.

* * * * *